May 28, 1968     G. M. SPENCE     3,385,919
METHOD OF USING A RELEASE COMPOSITION IN THE
FORMATION OF CEMENT ARTICLES
Filed Oct. 21, 1963
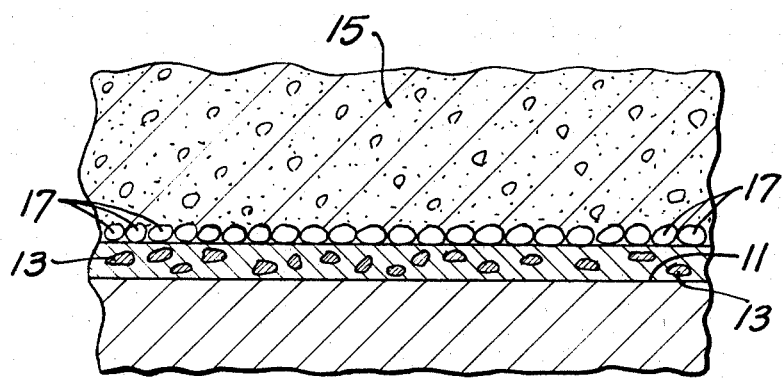
INVENTOR.
GERALD M. SPENCE
BY
EDWARD D. O'BRIAN
ATTORNEY United States Patent Office 3,385,919
Patented May 28, 1968

3,385,919
METHOD OF USING A RELEASE COMPOSITION
IN THE FORMATION OF CEMENT ARTICLES
Gerald M. Spence, Tehachapi, Calif., assignor to Monolith Portland Cement Company, Los Angeles, Calif.
Filed Oct. 21, 1963, Ser. No. 317,558
2 Claims. (Cl. 264—338)

This invention pertains to a method of utilizing new improved release compositions in facilitating the removal of concrete or similar or related articles formed from cement from surfaces used in connection with the manufacture of such articles. This invention pertains to a method of utilizing such release compositions.

In the manufacture of what are commonly referred to as "concrete" or "cement" articles a composition containing cement, water and normally other solids is applied to a surface in a plastic or somewhat pasty state, and is allowed to harden upon such a surface. This type of process is used in the manufacture of so-called "cement" pipe; in this case the surface employed is commonly referred to as a form or mandrel. Similar procedures are used in the formation of such articles as concrete blocks, building slabs and the like.

In the manufacture of any such articles the release of a final article from a surface used as a form during its manufacture is normally a problem. This problem tends to result from the fact that an aqueous cement composition tends to "wet" any such surface used as a form to a limited extent so as to effectively adhere to it, even after the cement within such a composition has hydrated so as to form what is referred to herein as a concrete article. As a consequence of this many different efforts have been made to provide release compositions for use in coating surfaces so as to facilitate the removal of concrete articles.

To a degree such prior release compositions have been effective; they are used in the manufacture of many different articles. In spite of this there is a need for improved release compositions which will facilitate the removal of the concrete or cement articles so as to avoid damage to such articles resulting from adherence to surfaces used in forming them.

An object of the present invention is to provide new and improved release compositions for use in connection with the manufacture of concrete or cement and related articles. A related object of the invention is to provide such compositions of this type which may be manufactured without difficulty at a comparatively nominal cost, which are easy to use, and which provide for an effective, reliable release of articles formed from portland or other cements from a form or mandrel. Another object of this invention is to provide a simple, relatively effective method for using such a composition so as to release articles formed from portland or other cements from a surface or form used in the manufacture of such articles.

These and various other objects of this invention will be apparent in the careful consideration in the remainder of this specification, the appended claims and the accompanying drawing in which:

There is shown a cross sectional diagrammatic type of view illustrating the use of a release composition in connection with the manufacture of an article from portland cement.

From a careful consideration of this drawing and of the remainder of this specification it will be apparent that this drawing is primarily intended for explanatory purposes, that it is not to be taken as limiting the present invention in any respect.

As an aid to understanding this invention it can be stated in summary that it concerns release type compositions including finely divided reactive metal particles suspended within a fluid carrier, this carrier including a water soluble binder for use in locating the metal particles upon a surface. During the use of a composition of this invention it is applied to a surface such as a form or mandrel or the like and so as to adequately bond or hold the metal particles upon the surface. Next a cement containing aqueous composition is applied to the coated surface and allowed to hydrate, forming a rigid article. During such hydration the water within such a composition will penetrate the metal particles, and by virtue of its caustic character will react to such particles, forming a multitude of gas bubbles. These gas bubbles will tend to "break" any suction between the surface and the article being formed so as to enable such an article to be removed from the surface without difficulty.

A composition of this invention preferably utilizes metal particles which are reactive with an aqueous solution of a type created by contact of water with common cement compounds or with a common cement composition. Such a solution is, of course, normally caustic in character. Suitable particles are common aluminum powder or flake particles. Other metals capable of reacting in an equivalent or substantially equivalent manner can be employed. Thus various alkaline earth metals such as magnesium can if desired be employed with this invention although such other metals are not considered to be as desirable for use with this invention as aluminum because of their cost and differences in their reactivity and the reactivity of aluminum.

The metal particles used in a composition of this invention need not be of any significant degree of purity. Preferably these particles or flakes should at least be small enough to pass a standard 100-mesh Tyler screen so that they can be suspended in a carrier as herein described without difficulty. Various different commercial grades of aluminum powders and flakes as are employed in printed circuit and paint fields can be utilized without difficulty in the release composition of this invention.

The carrier utilized with any such particles preferably consists of a solution of at least one water soluble binder capable of exhibiting sufficient adhesive properties with respect to aluminum or related metal and a conventional surface used in the manufacture of an article from a cement composition so as to hold such particles upon such a surface. A composition of this invention may, of course, in addition contain various secondary ingredients such as wetting agents, fillers and the like although this is not normally considered necessary.

The water soluble binders used in the composition of this invention are preferably selected from various well-known water soluble carbon compounds such as synthetic water soluble polymers or various naturally occurring hydrocolloids. Amongst the suitable commercially water soluble polymers are polyvinyl alcohol, carboxymethyl cellulose, carboxyethyl cellulose and the like. Amongst the suitable naturally occurring hydrocolloids are alginic acid, fruit pectin, gum arabic, guar gum and the like.

In a composition of this invention any such binder or mixture of binders used should of course be placed in solution with a solvent such as water. Such a solution should be adjusted by the solvent content so as to have substantially the viscosity of common types of paint. If desired such viscosity can be regulated to a degree so that such a solution contains as much binder as possible by including within the solution a restricted amount of an ion capable of effecting the viscosity of the binder used. Thus, for example, with an alginic acid binder a small quantity of a calcium ion may be added as through the addition of calcium citrate so as to increase viscosity.

Such a carrier solution may be mixed with the metal particles employed in a composition with the invention in virtually in any desired manner. Thus, common stirring techniques can be employed, or the metal particles can be milled with the liquid carrier in a common ball mill or the like. Preferably the amount of metal particles present should be controlled so as to have within the release composition as much water as possible while still not diluting this composition to a point where it will not adhere satisfactorily to a surface. The amount of metal particles which can be used in any specific carrier solution will, of course, depend upon the nature of the carrier solution. As a general rule with a carrier solution formed with water soluble polymer or hydrocolloids using water as a solvent and having a patentlike viscosity approximately two parts by weight of metal particles can be used per five parts by weight of carrier.

During the use of a release composition as herein described, it is applied to a surface such as the surface 11 in the drawing to be used as a form or support in the manufacture of a cement article. Preferably the release composition is applied to a sufficient extent so that such a surface is substantially uniformly covered with a thin film 13 of binder and metal particles so that it itself is not visible through such particles. After such a surface is so coated the carrier is preferably allowed to dry by the vaporization of solvent to at least a partial extent so that the binder in it holds the metal particles in place, preventing these particles from being moved as a cement composition such as the composition 15 shown is applied to it.

The composition applied to any such surface may be a standard composition conventionally used in the formation of an article from cement. Such composition normally contains water and at least one other ingredient such as aggregate, sand, asbestos fiber or the like. By virtue of the contact of the cement compound with water, the water becomes alkaline in character. As a specific example of this when a conventional portland cement mixture is mixed with water, this water "picks up" from the cement a restricted amount of calcium ion and thus becomes caustic.

When such a cement composition is applied to a surface coated with a release composition of this invention the water within the cement composition will gradually penetrate the binder present and contact the metal particles in the release composition at the same time that the cement is hardening as by hydration. Because of the caustic character of such water reactions will take place with the metal particles, liberating a restricted amount of gas bubbles such as the bubbles 17 shown in the drawing. These gas bubbles will tend to "break" any suction between the article created by hardening and the surface, enabling such article to be more easily removed from such a surface after it has been formed than if the release composition had not been used.

Such removal can take place before the ultimate strength of the article being formed has been achieved by hydration of cement compounds. In certain instances, such as, for example, in the manufacture of so-called "cement" pipe from a portland cement-asbestos-silica-water mixture this enables the amount of time a form or mandrel is used in the formation of an article to be lowered. Economically this is considered to be important.

Those skilled in the art to which this invention pertains will realize that the release composition and method herein described may be employed or modified in a number of ways in accordance with routine engineering skill or ability. Because of the nature of this invention it is to be considered to be limited solely by the appended claims forming a part of the disclosure.

What is claimed is:

1. A method of forming an article from a cement, water containing composition against a surface so that such article is released from said surface which method comprises:

coating a surface with water soluble film containing metal particles capable of reacting with an aqueous caustic solution so as to form a gas so that said metal particles cover said surface so that said film adheres to said surface;

locating an aqueous, plastic cement composition against said coated surface, said composition being caustic in character, said cement within said composition being capable of forming a solid article; and allowing the cement in said composition to form a solid article, said composition contacting said metal on said surface during the formation of said article and reacting with said metal, forming gas bubbles between said surface and said article, facilitating the removal of said article from said surface.

2. A method of forming an article from a Portland cement, water containing composition against a surface so that such article is released from said surface which method comprises:

coating a surface with a water soluble film containing aluminum metal particles capable of reacting with an aqueous caustic solution so as to form a gas so that said aluminum metal particles cover said surface so that said film adheres to said surface;

locating an aqueous, plastic portland cement composition against said coated surface, the water within said composition, being alkaline, said cement within said composition being capable of hydrating so as to form a solid, hydrated article; and allowing the portland cement within said composition to hydrate so as to form a solid, hydrated article while the water within said composition contacts said metal on said surface so as to cause a reaction with said metal, forming gas bubbles between said surface and said article, said gas bubbles serving to facilitate the removal of said article from said surface.

No references cited.

JAMES A. SEIDLECK, *Primary Examiner.*

J. H. WOO, *Assistant Examiner.*